United States Patent

[11] 3,634,116

| [72] | Inventors | Lloyd M. Woerner<br>Freeland;<br>William C. Kivela; George J. Quaal, both of<br>Midland, all of Mich. |
|---|---|---|
| [21] | Appl. No. | 829,809 |
| [22] | Filed | June 2, 1969 |
| [45] | Patented | Jan. 11, 1972 |
| [73] | Assignee | Dow Corning Corporation<br>Midland, Mich. |

[54] SILICON-CARBIDE-ENCASED GRAPHITE ARTICLES AND THEIR PRODUCTION
21 Claims, No Drawings

[52] U.S. Cl. .................................................. 117/106 C,
117/46 CC, 117/98, 117/DIG. 11, 23/208 A
[51] Int. Cl. ........................................................ C23c 11/10
[50] Field of Search ........................................... 23/208 A;
117/106 R, 46, 228, 98, DIG. 11

[56] References Cited
UNITED STATES PATENTS

| 992,698 | 5/1911 | Tone .......................... | 23/208 A |
| 1,058,800 | 4/1913 | Smith et al. ................. | 23/208 A |
| 2,677,627 | 5/1954 | Montgomery et al. ........ | 117/106 C |
| 3,108,018 | 10/1963 | Lewis .......................... | 117/46 X |
| 3,126,296 | 3/1964 | Montaud ..................... | 117/46 |

*Primary Examiner*—Alfred L. Leavitt
*Assistant Examiner*—William E. Ball
*Attorneys*—Robert F. Fleming, Jr., Laurence R. Hobey, Harry D. Dingman and Howard W. Hermann

ABSTRACT: Articles of manufacture having a graphitic body are encased by a porous, fluid-permeable, continuous casing of individual silicon-carbide-encased graphite particles which are diffused into and integral with the entire outer surface of the graphitic body. This casing is produced by forming a silicon monoxide vapor, by the reaction of silicon and silicon dioxide powders, for example, which vapor in turn is diffused into the graphitic body and reacted with graphite particles near the surface of the graphitic body to form, in situ, the individual silicon carbide casings that constitute the continuous casing of the entire outer surface.

SILICON-CARBIDE-ENCASED GRAPHITE ARTICLES AND THEIR PRODUCTION

BACKGROUND OF THE INVENTION

The present invention relates to an improved graphite article, and more particularly, to a graphitic body encased by a hard, abrasion-resistant casing with intrinsic microscopic surface irregularities therein, and to the method of making the same.

Graphite articles are presently used in many applications wherein they are exposed to destructive wear. This is true, for example, in applications where fluids move across the surface of the graphite article with rapid velocity over extended periods of time. Such destructive wear is also common to graphitic bearing surfaces and graphitic mechanical seals.

Further, most such graphite articles are formed and bound together by a binder material such as asphalt or a phenolic resin. Accordingly, to obviate their destruction, such graphite articles can only be used in those environments which are not reactive with their binder materials.

To prevent the destruction of graphite articles subjected to extended wear, a very hard shell or coating can be formed on the outer surfaces of those articles. Such very hard shell or coating can be, for example, a cemented carbide, which is generally tungsten carbide, titanium carbide and/or tantalum carbide particles bonded in a matrix binder material, usually cobalt. Or, a silicon carbide coating can be vapor deposited on the graphite article to provide the very hard shell.

One disadvantage of graphite articles that have such very hard shells or coatings is that they are difficult to finish to the flatness or shape desired because of the hardness of that shell or coating. If a graphite article to be coated has an irregular outer surface, a coating vapor deposited onto it will not be of uniform thickness throughout the irregularities of that surface. Likewise, a coating of cemented carbide on such an irregular graphite article will not produce a sharply defined replica of the outer surface of that graphite article. Further, because these hard shells are coatings on the outer surface of the articles, additional thickness is added to the dimensions of the articles. Thus, when a precise shape, dimension or flatness is required for the article, because of the hardness and nonuniformity of the coatings, a large amount of time and effort must be expended to finish the graphite article to that desired shape, dimension or flatness.

Further, most hard shell or coating materials used for coating graphite articles are dense and unimpregnable. In many instances, it is desirable to have such dense and unimpregnable surfaces on the graphite articles. However, when it is desired to use such an article in combination with a lubricant material to reduce the friction and wear on that article, the combination of a very hard coating together with a lubricant is not easily attained because of the extreme problems associated with suitably attaching or maintaining the lubricant material on such a dense and unimpregnable surface.

Accordingly, various methods have been devised for providing microscopic surface irregularities in the above-mentioned very hard shells or coatings. These microscopic surface irregularities can then be loaded or impregnated with a suitable lubricant. Such methods include acid-etching the binder material out of the coating to provide the surface irregularities, sandblasting the coating, vapor-blasting the coating, anodic etching of the coating and cathodic sputtering of the coating. Additionally, various organic binders have necessarily been used to bond the lubricant to the surface irregularities. Generally, those binders are detrimental in that they alter the properties of the lubricant material, especially the thermal properties.

SUMMARY OF THE INVENTION

The primary object of the invention, therefore, is to provide an improved graphite article having a hard, abrasion-resistant outer surface, which article will be free from the aforementioned and other disadvantages of prior articles of this type.

More particularly, it is an object of the present invention to provide a graphite article containing no binder material therein and having a hard, abrasion-resistant surface which is a precise replica of the outer surface of the graphite article prior to the formation of that hard surface thereon and which hard, abrasion-resistant surface can have a lubricant impregnated therein without the necessity of artificially creating surface irregularities therein.

A further object is to provide a method of forming the article of the present invention which is less expensive and less time consuming than the methods of forming prior art devices of this type.

In accordance with these and other objects, there is provided by the present invention a porous, fluid-permeable graphite article that has a hard, abrasion-resistant outer surface with impregnable microscopic surface irregularities therein. The hard, abrasion-resistant surface is a porous, fluid-permeable, continuous casing of substantially uniform thickness that is integral with and diffused into the entire outer surface of the graphite article. The continuous casing is in fact a chemically bonded barrier of individual graphite particles which are themselves encased by silicon carbide.

The casing is formed by diffusion of a silicon monoxide vapor through the entire outer surface of the graphite article and the resultant stoichiometric reaction of that vapor and graphite particles of that article to form the individual silicon-carbide-encased graphite particles. The casing thus formed is a precise replica of the outer surface of the graphite article before the casing was formed thereon and changes the dimensions of the graphite article by an amount which requires a minimum of further finishing of the article to prepare it for its intended use.

Finally, the pores of the casing provide intrinsic microscopic surface irregularities on the outer surface of the graphite article, which irregularities can readily be impregnated with a lubricant material.

DESCRIPTION OF THE PREFERRED EMBODIMENTS

Other objects and advantages of the invention will be described and will be apparent from the following description of several embodiments of the invention.

In general, the article of the present invention can be produced from any porous and silicon-monoxide-permeable graphite body. Such a body having some desired, predetermined shape is placed into a suitable reaction chamber or furnace and heated to at least 1,400° C. A silicon monoxide vapor is then transported to the graphite body in the furnace in such a manner that the entire outer surface of the graphite body is surrounded by that vapor. The vapor is then diffused into the pores of the graphite body and stoichiometrically reacted with the graphite particles of that body according to the equation $SiO + 2C = SiC + CO$. That stoichiometric vapor-solid reaction results in the conversion, in situ, of some portion of each graphite particle to a silicon carbide casing on the portion of that particle which is not converted to silicon carbide. The physical size of the silicon carbide and graphite particle formed by the above-stated reaction is substantially identical to the original particle size of the graphite particle before that reaction.

Because the above-described diffusion and in situ vapor-solid reaction takes place through the entire outer surface of the graphite body, the resultant article is a graphite body having a continuous casing of individual silicon-carbide-encased graphite particles integral with and diffused into the entire outer surface of the graphite body. Further, it has been found that since the graphite particles are individually encased in silicon carbide, and not merely coated onto the graphite, the casing does not spall off the graphite article as the graphite expands and contracts. Since more silicon monoxide vapor is able by diffusion to reach the graphite particles near the outer surface than is able to reach those graphite particles deeper into the graphite body, the ratio of silicon carbide to graphite in the casing decreases in the direction from the outer surface of the article produced to the center of the graphite body.

Additionally, since the silicon carbide casings are formed from and replace portions of the graphite particles of the graphite body, the pores or interstices of that body are not plugged or filled by the silicon carbide so formed, but in fact remain substantially as they were before the silicon monoxide diffused into them. Coincidental with the forming of the individual silicon carbide casings, the carbon monoxide formed in the above-stated reaction escapes from the graphite article through its pores and probably insures their remaining open. Thus, the casing on the graphite body is found to be equally as porous and fluid-permeable as the graphite body which it encases. That porosity is extremely useful, since the pores or interstices of that casing advantageously provide intrinsic microscopic surface irregularities on the article produced, thereby obviating the need to produce such irregularities artificially when, for example, it is desired to impregnate the article with a lubricant material.

A still further characteristic of the casing formed by the method of this invention is that the casing is not a coating or shell in the true sense of those words, but instead a skin or outer layer which is a precise replica of the outer surface of the starting graphite body itself, regardless of the topography or irregularities of that body. Accordingly, the casing of the present invention when formed on a graphite body has substantially uniform thickness over the entire outer surface of that body and provides a hard, abrasion-resistant surface that requires a minimum of further finishing of the article to prepare it for its intended use. This fact can be of great significance when it is necessary to have an article finished to some precise shape, dimension or flatness.

In general, the intended use of the article produced by this invention dictates the characteristics of the graphite body or core of the article. That is, because the reaction by which the casing is formed on the article depends on the diffusion of silicon monoxide vapor into that article, the graphite body of that article must be porous and fluid-permeable enough to allow that diffusion. But, if the article produced is to be used as a fluid seal, for example, the graphite body must not be so porous as to allow leakage of the fluid supposedly being sealed, nor should the pore structure of the graphite provide a continuous channel in the body through which the fluid can leak. In addition, the finish and flatness required of such a seal must also be considered, since they too depend on the porosity and particle size of the graphite in the graphite body. Thus, the type of graphite used for a given article is dictated by an acceptable balance of the porosity required of that article and the thickness of the casing desired for that article.

A further consideration regarding the type of graphite used in a given article is the fact that the stoichiometry of the casing can be varied by varying either the particle size of the graphite used or the amount of silicon monoxide vapor transported to the body of graphite. Thus, if a casing with relatively large graphite particles and relatively thin individual silicon carbide casings is desired, a large grain size, for example, $3.7 \times 10^{-2}$ inches, could be used. If a casing with relatively small graphite particles and relatively thick individual silicon carbide casings is desired, a smaller grain size, for example, $2 \times 10^{-3}$ inches, could be used. Then by transporting the same volume of silicon monoxide vapor to each of the graphite bodies having grain sizes as stated, the desired casing will be formed by the subsequent vapor-solid reaction. Similarly, the same two desired casings described above could be formed by using the same grain size in each of the graphite bodies and then transporting a different amount of silicon monoxide vapor to each of them. Finally, while the grain size of the graphite particles used to form the graphite bodies of the present invention can vary over a wide range of sizes, it has been found that the average size of the graphite particles preferred is from $2 \times 10^{-3}$ to $8 \times 10^{-3}$ inches.

The silicon monoxide vapor used in this invention can readily be produced by heating, preferably high-purity, silicon powder and silica to a temperature of at least 1,400° C. The formula $Si+SiO_2=2SiO$ describes the above reaction and has been well known in the chemical art for many years. Generally, the ratio of silicon powder to silicon dioxide powder can vary from 0.75:1 to 1.25:1. This method of preparing the silicon monoxide is preferred for the purposes of this invention, since no other vapors or products are formed therein that can contaminate, etch or otherwise affect, the casing formed on the article produced by this invention. However, other oxides of silicon, organic or inorganic, whether they be binary, ternary, quaternary, etc., can be used with silicon, or other reducing agents to yield the silicon monoxide needed. Typical oxides useful in the performance of this invention thus include calcium silicate, sodium silicate, bauxite, ethyl silicate, methyl silicate, aryloxy silanes and alkoxy silanes.

Generally, it is preferred to react the silicon and silicon dioxide powders in the same reaction chamber or furnace that the graphite body is in, thereby allowing the silicon monoxide vapor to be transported to that body by its own vapor pressure, without creating flow patterns in the furnace that could affect the uniformity of the casing formed on the article. But, the silicon monoxide vapor can also be formed in a separate zone or a separate reactor and transported by an inert gas, such as argon or helium, to the graphite body to be encased.

As previously stated hereinabove, the reaction between the silicon monoxide vapor and the graphite particles can take place at the temperature of 1,400° C. Preferably, the best temperatures for this step of the method of this invention lie in the range of 1,950° C. to 2,050° C. It has been found that reactions carried out at temperatures below this preferred range proceed too slowly and provide a less desirable casing, while those reactions carried out at temperatures above this range also provide a less desirable casing due to the competing reactions: $SiO+SiC=2Si+CO$, or $SiO_2+2SiC=3Si+2CO$, which occur at those higher temperatures and tend to decompose the casing.

If the stoichiometric reaction between the silicon monoxide vapor and the graphite particles is permitted to continue indefinitely, the graphite particles of the graphite body will eventually be completely converted to silicon carbide, as far into that graphite body as the silicon monoxide vapor is able to diffuse. This is true, of course, because the silicon carbide casing on the individual graphite particles remains fluid-permeable, thereby allowing the silicon monoxide vapor to continue to diffuse into and react with the graphite particle.

Although such a casing can be desirable when the graphite article has been formed for use as a bearing surface or seal body such as a plain bearing, journal bearing, ball bearing, pump seal or shaft seal, graphite particles in the casing are preferred. That preference is due to the fact that as the bearing surface or seal body begins to wear away, the exposed outside portions of the individual silicon carbide casings are worn away from the graphite particles in the casing. Consequently, those graphite particles are then exposed and can provide the bearing surface or seal body with a built-in, self-lubrication mechanism, as they bleed out of the casing.

Accordingly, it has been found that when the method of the present invention is carried out under the preferred conditions, that is temperature between 1,950° C. and 2,050° C., and grain size between $2 \times 10^{-3}$ and $8 \times 10^{-3}$ inches, the graphite particles will not be completely converted to silicon carbide if the temperature is allowed to drop below the preferred range within 15 minutes after the silicon monoxide vapor first started to react with the graphite particles at those preferred temperatures.

As indicated hereinabove, the thickness of the casing on the article of the present invention is directly dependent on the depth under the surface of the graphite body to which the silicon monoxide vapor can diffuse. Although it is preferred to use high-purity graphite, in some instances the graphite used can only have a minimum amount of impurities. Therefore, it is advisable and preferred to remove as many impurities and absorbed gases from the graphite body as possible before the body is to be encased, to allow the silicon monoxide vapor to diffuse into the body without interference from the outgassing of those gases and impurities. Such impurities and absorbed gases may be driven out of the graphite body by heating it in a vacuum to a temperature sufficient for that purpose. It has been found that for the purposes of this invention, the graphite body can be suitably purified by outgassing it at 1,530° C. and $10^{-7}$ mm. of Hg for a period of 4 to 6 hours.

In addition to the self-lubricating capabilities of the casing of the article of the present invention, the pores of the casing provide intrinsic microscopic surface irregularities that can be filled or impregnated with a lubricant material to provide lubrication between a bearing surface and another body or between a seal body face and another seal body. Dry or solid lubricants are particularly desirable and have been found to require no additional bonding or fusing to remain in the pores of the casing. Several suitable lubricants include graphite, which is preferred, mica, polytetrafluoroethylene, fluorinated ethylene propylene copolymers, vermiculite, boron nitride, tungsten disulfide and molybdenum disulfide. Additionally, it has been found that an article made by the method of the present invention provides good lubrication when its pores are impregnated with nothing other than water.

Further, the porous nature of the article of the present invention makes it ideal for an oil-impregnated bearing material. The entire article can readily be oil-impregnated. Additionally, the microscopic surface irregularities can be impregnated with a solid lubricant, thereby providing still further lubrication between the article of the present invention and a further body which it is in contact with.

A lubricant can be impregnated into the pores of the casing of the article of the present invention by merely rubbing or painting that lubricant onto the surface of the casing. If desired, however, the lubricant can be burnished into the pores by means of a textile fabric, an agate, steel wool, a steel ball, or the like, in the same manner that the term "burnishing" is generally applied to metalworking.

It is characteristic of the silicon carbide casing formed on a graphite body by this invention that some free silicon atoms are present in the monomolecular layer on the outer surface of the casing. If desired, those free silicon atoms can readily be removed from the surface by subjecting the surface to a mineral acid or alkali treatment, for example, hydrofluoric acid or caustic soda. However, it has been realized, that when the article of the present invention is to be used as a bearing surface or a seal body, it is advantageous to allow those free silicon atoms to become hydrated and remain a part of the surface of the article. Such hydration can be accomplished by allowing the article to be placed in a hydrous atmosphere while the free silicon atoms exist on its outer surface. By the term "hydrated," it is to be understood that the free silicon atoms are associated with water either in the form of molecular water or as hydroxyl radicals bonded to the silicon atoms.

The value of having such hydrated silicon atoms on the surface of the article relates to the fact that solid lubricants, such as graphite or molybdenum sulfide, require at least some moisture to function as lubricants. Thus, in an anhydrous setting, the hydrated silicon atoms can provide the moisture required by the lubricant material being used on the article and a further body with which it is in contact.

Accordingly, it will be obvious to those skilled in the art that the article of the present invention provides a graphite article requiring no binder material to hold it together and having a hard, abrasion-resistant surface which is a precise replica of the outer surface of the graphite article prior to the formation of that hard surface thereon. Additionally, that hard, abrasion-resistant surface provides intrinsic microscopic surface irregularities that allow the article so produced to have a lubricant material impregnated into it without the necessity of first creating artificial surface irregularities on the article and without the necessity of bonding that lubricant material to the article.

It will be realized further, that the starting materials, or raw materials, used in the method of the present invention are inexpensive and readily available commercially. Likewise, the method and apparatus of the present invention are direct, simple, uncomplicated and inexpensive to perform or obtain.

Therefore, having now described the invention in specific detail and exemplified the manner in which it may be carried into practice, it will be readily apparent to those skilled in the art that innumerable variations, applications, modifications and extensions of the basic principles involved may be made without departing from its spirit or scope. Specifically, the present invention can be practiced as set forth in the following examples.

EXAMPLE 1

A slotted graphite, rotary seal body having an outer diameter of 1.550 inches, inner diameter of 1.015 inches, width of nine-sixteenths inch and a cavity concentric with the inner and outer diameters being three-eighths of an inch deep and having a diameter of 1.250 inches, was provided with a 15-mil casing by the method of the present invention. The seal body was machined from a block of bulk graphite having a particle size of $2 \times 10^{-3}$ inches. Because flatness is a prime requisite of seal body faces, the face of the rotary seal body was then lapped with 2,000 grit $Al_2O_3$ and water until it was within $34.8 \times 10^{-}$inches of flat. Then the seal body was hung on a graphite rod mounted in a graphite boat or chamber having a removable top with a vent therein to allow the slow escape of reaction products and reactants from the boat. The bottom of the graphite boat was loaded with silicon and silicon dioxide powder in a 1 to 1 ratio. Then, with the top in place, the boat was placed into a furnace. Next, the furnace was purged by continuously flowing a stream of the inert gas argon through it. The furnace was then heated to a temperature of 2,000° C. and allowed to remain at that temperature for a period of 15 minutes at which time the temperature of the furnace was allowed to return to a normal room temperature. When the rotary seal body was removed from the graphite boat, it was found to have a hard, abrasion-resistant casing formed thereon integral with and diffused into its outer surface. The depth of the casing was found to be 15 mils. The face of the rotary seal body was then lapped with a 30-micron diamond wheel for 4–6 minutes and then finished with a 1-micron diamond paste until it was flat to within $34.8 \times 10^{-6}$ inches. The rotary seal body was then installed in a pump and mated with an ordinary graphite stationary seal body insert. The pump was operated continuously at 100° C. and 3,500 r.p.m. to pump a silicone fluid containing an abrasive clay catalyst. After 720 hours the rotary seal body was still operating effectively without any leakage. Usually, when the same type of ordinary graphite seal was mated with a ceramic rotary seal and operated together in the same pump, the pump would begin to leak badly after only 2 hours.

EXAMPLE 2

Using the same apparatus and procedure as that explained in example 1, a stationary seal ring having an outer diameter of 1.625 inches, inner diameter of 1.062 inches and a rim concentric with the outer and inner diameters having the same inner diameter and an outer diameter of 1.434 inches was encased. The grain size of the bulk graphite used was $8 \times 10^{-3}$ inches. The depth of the casing formed on the stationary seal ring was found to be 20 mils. When this stationary seal ring was mated with a ceramic rotary seal ring and installed in a water pump continuously operating at 185° F. and 3,500 r.p.m., the pump was found to be operating without any leakage after 2,000 hours.

EXAMPLE 3

Using exactly the same apparatus and procedure as that in example 1, a rotary seal body was made having a 15-mil casing. That casing was then impregnated with molybdenum sulfide by burnishing the molybdenum sulfide into the pores of the casing.

That which is claimed is:

1. A method of making an article of manufacture having a hard, abrasion-resistant outer surface with intrinsic microscopic surface irregularities, comprising:

forming a porous, fluid-permeable body of graphite to a predetermined shape, placing said body of graphite into a furnace and heating said furnace to between 1,400° C. and 2,050° C.

forming a silicon monoxide vapor and transporting said vapor to said body of graphite in said furnace, causing said silicon monoxide vapor to diffuse into said porous body of graphite through the entire outer surface of said body and to react with the graphite particles of said body to form, in situ, individual silicon carbide casings on said graphite particles, whereby a porous, fluid-permeable, continuous casing of substantially uniform thickness is formed by said silicon-carbide-encased graphite particles, integrally encasing and diffused into the entire outer surface of said body of graphite, the pores of said casing providing intrinsic microscopic surface irregularities on the outer surface of said article.

2. The method of claim 1, wherein said furnace is heated to a temperature between 1,950° C. and 2,050° C.

3. The method of claim 2, wherein said temperature is maintained in said furnace for not more than 15 minutes.

4. The method of claim 1, comprising the further step of:
impregnating said microscopic surface irregularities on the outer surface of said article with a lubricant material.

5. The method of claim 4, wherein said lubricant is a solid lubricant material.

6. The method of claim 5, wherein said solid lubricant is chosen from the group consisting of graphite, mica, polytetrafluoroethylene, fluorinated ethylene propylene copolymers, vermiculite, boron nitride, tungsten disulfide and molybdenum disulfide.

7. The method of claim 4, wherein said lubricant is water.

8. The method of claim 4, wherein said lubricant is an oil.

9. The method of claim 5, wherein said step of impregnating said surface irregularities with a lubricant material is accomplished by burnishing said lubricant into said surface irregularities.

10. The method of claim 1 and comprising the further step of:

outgassing said body of graphite in a vacuum at a temperature high enough to remove impurities and absorbed gasses from said body of graphite before said body of graphite is placed into said furnace.

11. The method of claim 10, wherein said outgassing is performed at 1,530° C. and $10^{-7}$ mm. of Hg for at least 4 hours.

12. The method of claim 1, wherein said method includes the step of forming on said body of graphite a bearing surface adapted to contact a further body and to have relative motion in contact with said further body.

13. The method of claim 1, wherein said method includes the step of forming said body of graphite to the shape of a seal body having a face adapted for engaging a further seal body with rubbing contact therebetween to provide a fluid seal.

14. The method of claim 13, wherein said body of graphite consists of graphite particles not less than $2 \times 10^{-3}$ inches and not greater than $8 \times 10^{-3}$ inches in diameter.

15. The method of claim 14, comprising the further step of:
lapping the face of said seal body until it is flat to within $34.8 \times 10^{-}$ inches before said seal body is placed into said furnace.

16. The method of claim 15 and comprising the further step of:
lapping and polishing said continuous casing on said face of said seal body until it is flat to within $34.8 \times 10^{-6}$ inches.

17. The method of claim 16, wherein said casing is lapped with diamonds and polished with diamond pastes.

18. The method of claim 16 and comprising the further step of:
impregnating said seal body with a lubricant.

19. The method of claim 1 and comprising the further step of:
allowing a monomolecular layer of hydrated silicon atoms to be formed on the outer surface of said casing by exposing said silicon atoms to a hydrous atmosphere.

20. The method of claim 1, wherein silicon and silicon dioxide powders are reacted within said furnace to form said silicon monoxide vapor and said silicon monoxide is transported to said body of graphite by its own vapor pressure.

21. The method of claim 1, wherein silicon and silicon dioxide powders are reacted in a reactor external to said furnace to form said silicon monoxide vapor and said silicon monoxide vapor is transported to said body of graphite by an inert gas.

* * * * *

U.S. PATENT OFFICE
UNITED STATES PATENT OFFICE
CERTIFICATE OF CORRECTION

Patent No. 3,634,116          Dated: January 11, 1972

Lloyd M. Woerner, William C. Kivela
and George J. Quaal

It is certified that errors appear in the above-identified patent and that said Letters Patent are hereby corrected as shown below:

Col. 6, line 27, the expression "$34.8 \times 10^{-}$" should read --$34.8 \times 10^{-6}$--.

Col. 8, line 21, the expression "$34.8 \times 10^{-}$" should read --$34.8 \times 10^{-6}$--.

Signed and sealed this 12th day of September 1972.

(SEAL)
Attest:

EDWARD M. FLETCHER, JR.
Attesting Officer

ROBERT GOTTSCHALK
Commissioner of Patents